PROCESS FOR PRODUCING METHYL FORMATE
Filed Sept. 9, 1971
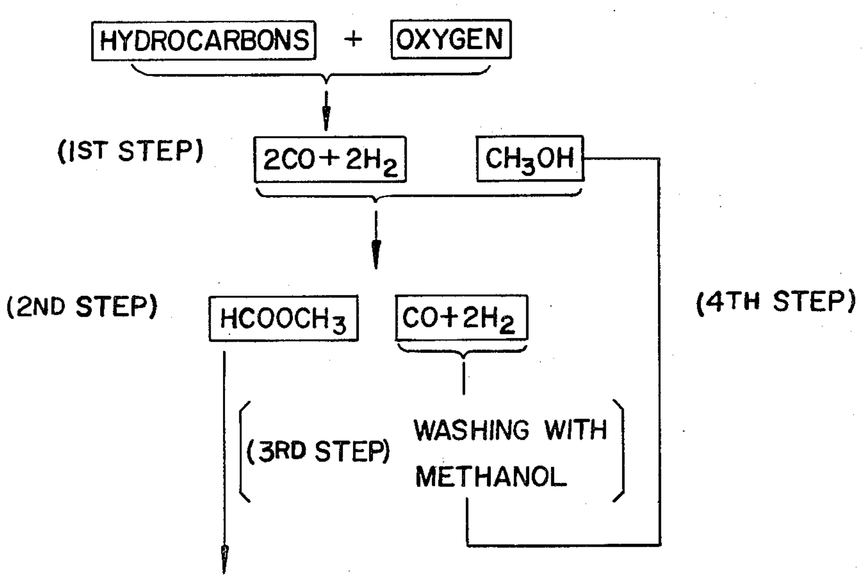
INVENTORS
Hachiro Wakamatsu
Koichi Shimomura
BY
Kelman and Berman
AGENTS United States Patent Office 3,816,513

Patented June 11, 1974

3,816,513

PROCESS FOR PRODUCING METHYL FORMATE

Hachiro Wakamatsu, Tokyo, and Koichi Shimomura, Yokohama, Japan, assignors to Ajinomoto Co., Inc., Tokyo, Japan Filed Sept. 9, 1971, Ser. No. 178,933
Int. Cl. C07c *67/00*
U.S. Cl. 260—488 K 7 Claims

ABSTRACT OF THE DISCLOSURE

Carbon monoxide and methanol are reacted in gaseous or liquid phase to methyl formate at elevated pressure in the presence of an alkaline catalyst and of sufficient hydrogen to permit the unreacted carbon monoxide in the reaction mixture to be converted to methanol, the methanol being recycled to the methyl formate synthesis in continuous operation.

This invention relates to the production of methyl formate, and particularly to a process for producing methyl formate from carbon monoxide and hydrogen.

It is known to produce methyl formate from methanol and carbon monoxide in gaseous or liquid phase at elevated pressure in the presence of an alkaline catalyst [British Pats. 970,072 and 1,084,549; Indian J. Technol., *5* [8], 266–7 (1967)] and also to produce methanol in good yields from a mixture of carbon monoxide and hydrogen in a mole ratio of 1:2 [Chem. & Process Engg., 1968 [6], 69; British Pat. 1,010,871; Hydrocarbon Processing, *40* [11], 202 (1969)].

When methyl formate is to be prepared by combining the above-mentioned methods, it is necessary to purify the CO—$H_2$ mixture for the methanol synthesis and to separate the hydrogen gas from the reaction product to make the same suitable for the methyl formate synthesis. The combination of the two known methods is a complex operation and not economically feasible for this reason.

It has now been found that methyl formate can be prepared in continuous operation from a single stream of carbon monoxide and hydrogen gas in excellent yields by the following sequence of steps illustrated in the sole figure of the drawing.

FIRST STEP

Carbon monoxide and hydrogen in a mole ratio of not more than 2:1 and methanol are held at elevated pressure in the presence of an alkaline catalyst until not more than one half of the carbon monoxide reacts with the methanol to form methyl formate, the amount of methanol being at least sufficient for such a reaction.

SECOND STEP

The temperature of the reaction mixture is reduced until the methyl formate formed separates as a liquid from the unreacted gases and may be withdrawn from the system.

THIRD STEP

The unreacted gases are washed with cold methanol to remove constituents not liquefied in the second step, and the washing liquid may be returned to the first step or recycled in the third step after being fractionated.

FOURTH STEP

The washed gas, essentially consisting of pure carbon monoxide and hydrogen, is reacted in the presence of a catalyst for methanol synthesis to form methanol, as is known in itself. A portion of the methanol may be recycled to the third step, and the remainder of the reaction product to the first step. The unreacted gas is recycled in the fourth step.

As indicated in the drawing, the initial gas mixture may be prepared by partial oxidation of hydrocarbons in petroleum or natural gas, but other known methods are available such as the partial oxidation of coke and the reforming of hydrocarbons in the presence of carbon dioxide and steam. Mixtures of carbon monoxide and hydrogen suitable for this invention are also obtained as byproducts when acetylene is produced from other hydrocarbons and in many other processes. The mixture should contain carbon monoxide and hydrogen in a mole ratio of not more than 2:1, and ratios of 1:1 to 1:2 are preferred. An excess of hydrogen greater than 100 mole percent is ballast which does not interfere with the reaction, but adversely affects the economics of the process.

The gas mixture should contain less than 10 p.p.m. sulfur, and not more than 0.5% carbon dioxide and 1% water, and this is readily achieved by conventional methods. The catalysts employed in the first step are not poisoned when these impurities are held within the above-mentioned values and function satisfactorily over long periods. The sulfur and unsaturated hydrocarbons, such as olefines and dienes, are converted in the first step to high-boiling compounds which are readily separated from the unreacted gas and thus do not affect the later steps, particularly the methanol synthesis in the fourth step.

The alkaline catalysts employed in the first step include alkoxides and weak acid salts of the alkali metals, that is, lithium, sodium, potassium, rubidium and caesium, and weak acid salts of the alkaline earth metals, that is, beryllium, magnesium, calcium, strontium and barium. The alcohol moieties in the above alkoxides may be alkanols including cycloalkanols, or alkoxyalkanols having up to six carbon atoms such as methanol, ethanol, n-propanol, iso-propanol, n-butanol, iso-butanol, amyl alcohol, cyclohexanol, 2-methoxyethanol, 2-ethoxyethanol, 2-propoxyethanol, 3-methoxypropanol and 4 - methoxybutanol. Weak acids suitable for forming the above-mentioned salts have pK values at 20–25° C. between 3.5 and 7 and include carbonic acid and carboxylic acids such as formic acid, acetic acid and benzoic acid. The alkaline catalysts may be combined in a known manner with ethylene oxide, and/or alkyl-, cycloalkyl-, aralkyl- or aryl-substituted ethylene oxide (British Pats. 970,072 and 1,084,549).

The temperature of the reaction zone in the first step of this process is held at 20° C. to 140° C., preferably at 80° C. to 120° C., and the mole ratio of methanol to carbon monoxide should be between 1:0.5 and 1:5, preferably between 1:1 and 1:3. The dwell time in the reaction zone is controlled in such a manner that not more than one half of the carbon monoxide originally present is consumed, the remainder being available for the methanol synthesis in the fourth step. The first step is preferably performed at a pressure between 50 and 200 atmospheres. The pressures maintained throughout the system may be closely similar, and both reactions may be performed at the same pressure, thereby avoiding the need for compressors within the system.

When methyl formate is formed in liquid phase, the gaseous starting materials are injected into the reaction mixture. By feeding the gases including hydrogen gas, which does not interfere with the methyl formate formation, to the liquid reaction mixture in this manner, the latter is stirred efficiently. The temperature distribution in the reaction mixture is uniform and a higher yield of methyl formate based on methanol can be obtained. When the reaction is carried out in a gas phase, the hydrogen present as a diluent makes temperature control much easier than in the synthesis of methyl formate from methanol and carbon monoxide free from hydrogen.

When the reaction mixture is cooled in the second process step, a condensate of methyl formate and unreacted methanol separates from the gas mixture essentially consisting of carbon monoxide and hydrogen in a ratio of 2:1 to 1:4, depending on the initial composition and other variables. The condensate is fractionated to separate the methyl formate from the higher-boiling constituents, such as methanol and catalyst. As the methyl formate formed is very volatile, it can also be separated from higher-boiling constituents of the condensate by blowing hot gases withdrawn from the first reaction zone through the condensate. The methyl formate may be further rectified, if desired, while the higher-boiling constituents are returned to the first step.

The gaseous material discharged from the condensation zone is washed with cold methanol for removing residual catalyst, methyl formate and impurities such as sulfur, and the washing liquid may be returned to the first step or recycled in the washing zone after being fractionated. A conventional extraction tower may be employed for counter-current contact of the ascending gas with the descending liquid methanol, cooled to 0° C. or less. The catalyst and residual methyl formate are extracted from the gas, and the methanol may be recovered, if so desired, by heat exchange with hot gases discharged from the fourth step. The washed gas is practically free from materials poisonous to the catalysts for methanol synthesis employed in the fourth step, such as sulfur and unsaturated hydrocarbons, which are readily held to concentrations of less than 0.1 p.p.m.

In the methanol synthesis of the fourth step, the mole ratio of carbon monoxide to hydrogen must be smaller than 1:2, and the methanol produced should be sufficient for supplying the first step. The method of the invention may be controlled to maintain the desired quantitative relationships by feeding the carbon monoxide-hydrogen mixture to the first step only. If this is not convenient, a portion of the feed gas is subjected to the water gas shift in the presence of a conventional catalyst system. The impurities initially present in the raw gas are thereby removed, making the reaction product suitable for methanol synthesis.

The production of methanol from carbon monoxide and hydrogen may be carried out according to conventional processes at low pressure, medium pressure, or high pressure [British Pat. 1,010,871 and Hydrocarbon Processing, [*40*] [11], 202 (1969)], known catalysts for methanol synthesis, for example copper-bearing catalysts, being used. The optimum gas pressure in the methanol synthesis reactor varies between 30 and 350 atmospheres, depending on the catalyst employed. However, the process of this invention may be operated to maintain the pressures throughout the system closely similar, as described above. If the pressure of the cold, washed gas is lower than that required for the methanol synthesis, it is compressed to not more than ten times its initial pressure prior to entering the methanol reactor. It may contain up to 30% of inert gases, such as methane or nitrogen and a relatively small amount of carbon dioxide without affecting the yield.

If a copper-bearing catalyst is used, the methanol synthesis is preferably performed at a catalyst temperature of about 250° C. and a gas pressure of 30 to 200 atmospheres, preferably 40 to 100 atmospheres. It is preferred to react one mole of carbon monoxide and carbon dioxide with two to three moles hydrogen. The condensate obtained by cooling the reaction mixture consists of aqueous methanol 99% pure and is recycled to the first step after being dried if it contains objectionably large amounts of water. It may find partial intermediate use in the third step, as described above. If the unreacted gas does not contain more than 30% inert ingredients, it may be recycled to the methanol reactor. An excess of inert gas is removed from the system by periodic or continuous release of a fraction of the gas from the high-pressure system.

The following examples further illustrate this method.

EXAMPLE 1

A gas consisting of 48% CO, 47% hydrogen, 4% $CO_2$, 0.3% $CH_4$, 0.4% S, and 0.3% other gases, mainly nitrogen, was prepared at 29 atmospheres in a conventional manner from crude oil, oxygen, and steam. It was cooled to 40° C. and desulfurized with N-methyl-pyrrolidone, whereby sulfur and carbon dioxide in the gas were reduced, respectively, to 2 p.p.m. and 0.1%, all percentage values being by volume.

Most of the purified gas was introduced in a continuous stream into a reactor filled with methanol containing potassium methoxide in a concentration of 48 g./l., and maintained at 100 atmospheres and 80° C. Methanol containing potassium methoxide in the same concentration as above was fed to the reactor at a rate of 50 mole percent of the carbon monoxide supplied.

The gas continuously discharged from the reactor was cooled at its prevailing high pressure to condense a liquid containing 69% methyl formate, 26% methanol, 4% potassium methoxide and 1% water by weight. The condensate was transferred to a low pressure vessel, in which it released dissolved gases, and thereafter fractionated. The methyl formate fraction was rectified, and the higher-boiling compounds such as methanol, potassium methoxide, and water were diluted with methanol and returned to the reactor by a pump. A portion of the higher-boiling compounds was removed from the system in order to keep the water content in the system at not more than 0.1% before dilution with methanol. The gases released at low pressure were stripped of useful ingredients by washing with methanol and thereafter vented to the atmosphere or burned under a boiler.

The gaseous fraction not condensed by cooling contained hydrogen and carbon monoxide in a ratio of 1:0.7. It was mixed with the remainder of the purified raw gas, and the mixture was washed with cold methanol in a counter-current washing tower from which the washed gas emerged at a temperature of −40° C. The washed gas mixture was mixed with steam and subjected to a water gas shift in the presence of a catalyst in the usual manner. The resulting gaseous mixture of carbon monoxide, carbon dioxide, and hydrogen was dried and fed to a methanol reactor. It contained less than 0.5 p.p.m. sulfur so as not to poison the catalyst.

Under typical operating conditions, the gaseous mixture fed to the methanol reactor consisted of 67% hydrogen. 18% carbon monoxide, 10% carbon dioxide, and 3.5% nitrogen and methane by volume. Generally, a volume ratio of 2 to 4 parts hydrogen to one part of carbon monoxide and carbon dioxide was maintained.

The methanol reactor contained a catalyst of copper, zinc, and chromium in an atom ratio of 4:2:2 on a graphite carrier and was held at 50 atmospheres and 250° C. The gas mixture was converted to methanol at a rate of 12% at a space velocity of 6000–7000 per hour, corresponding to a space time yield of 0.26 kg./liter/hour.

The gas continuously discharged from the methanol reactor was cooled to condense methanol containing water and being 99.5% pure. A portion of the methanol was employed for washing the gaseous fraction from the methyl formate reactor, and the remainder was distilled at atmospheric pressure to remove water, and returned to the methyl formate reactor. The gas discharged from the methanol reactor and not condensed by cooling was recycled to the methanol reactor until it contained 30% nitrogen, whereupon it was partly released from the high-pressure zone to keep the nitrogen concentration in the recycled gas below 30%. The discharged gas contained enough carbon monoxide, hydrogen, and methane to be used as fuel in a steam generator. Its expansion absorbed heat from the methanol to be used as a gas washing liquid.

EXAMPLE 2

In a modification of the procedure of Example 1, the gaseous fraction obtained after cooling the reaction mixture from the methyl formate reactor was washed with methanol at −40° C., and the washing liquid was fractionated to separate pure methanol, methyl formate and a small amount of sulfur bearing material from each other. The methanol was returned to the washing column, and the methyl formate to the liquid fraction obtained after cooling the reaction mixture from the methyl formate reactor. The methanol gradually lost from the washing column and fractionating column was made up from a separate stock of methanol.

A portion of the methanol produced from the gaseous discharge of the methyl formate reactor after washing and water gas shift, if needed, and a part of the unreacted gases from the methanol reactor were directly transmitted from the methanol reactor to the methyl formate reactor. The remainder of the gaseous reaction mixture was cooled to liquefy methanol and permit a portion of the unreacted gas to be withdrawn in order to reduce the concentration of inert gas (nitrogen) to less than 30%. The liquefied methanol was fed to the methyl formate reactor, and the remainder of the gas was recycled to the methanol reactor.

EXAMPLE 3

27 g. potassium metal was dissolved in 1 liter methanol to obtain a solution which weighed 820 g. and contained 48 g. potassium methoxide. The solution was placed in a reactor of 2 liter capacity equipped with a stirrer and kept at 80° C. A synthesis gas of hydrogen and carbon monoxide in a mole ratio of 1.67 containing 5 p.p.m. sulfur and 0.1% carbon dioxide was charged into the reactor until the pressure reached 100 atmospheres. 167 moles of the synthesis gas were fed to the reactor at this pressure for 26 minutes. After cooling to 25° C., the reaction mixture was taken from the reactor. It weighed 1226 g. and was fractionated at ordinary pressure to obtain 842 g. methyl formate, 323 g. methanol and 61 g. residue consisting of 48 g. potassium methoxide and 13 g. water. 58.1% methanol was converted to methyl formate at a rate of 72.5 g./hour/g. potassium. The unreacted gas consisted essentially of 100 moles hydrogen and 50 moles carbon monoxide.

The unreacted gas was mixed with a synthesis gas of 5.5 moles hydrogen and 5.5 moles carbon monoxide, and the mixture was washed with methanol at a pressure of 23 kg./cm.$^2$ and at −40° C. The washed gas contained sulfur in amounts of less than 0.5 p.p.m.

The washed gas was mixed with steam, passed over a catalyst for conventional water gas shift at a pressure of 85 kg./cm.$^2$, and dried, whereby 70 moles hydrogen, 19 moles carbon monoxide, and 12 moles carbon dioxide at a pressure of 91 kg./cm.$^2$ were obtained. This mixture was expanded to 80 kg./cm.$^2$, passed over a copper/zinc/chromium catalyst (40/20/20) at 250° C. at a space velocity of 10,000 per hour to yield methanol at a conversion rate of 12%. The space time yield of methanol was 770 g. per liter of catalyst and hour. The methanol recovered by condensation from the reaction mixture contained less than 0.5 mole percent organic impurities.

What is claimed is:

1. A process for producing methyl formate which comprises:

(a) contacting carbon monoxide, hydrogen, and methanol in a first reaction zone with a catalyst at a pressure of 50 to 200 atmospheres and a temperature of 20° to 140° C. until not more than one half of said carbon monoxide reacts with said methanol to form methyl formate, (1) the mole ratio of said carbon monoxide to said hydrogen in said zone being not greater than 2:1, (2) the mole ratio of said methanol to said carbon monoxide in said zone being between 1:0.5 and 1:5, (3) said catalyst being an alkoxide of an alkali metal or a salt of a weak acid with an alkali metal or alkaline earth metal, the alcohol moiety of said alkoxide being an alkanol, cycloalkanol, or alkoxyalkanol having up to six carbon atoms, and said weak acid being carbonic acid or a carboxylic acid having a pK value at 20°–25° C. of 3.5 to 7;

(b) cooling the reaction mixture so obtained in a condensation zone until said methyl formate is condensed and thereby separated from uncondensed gas;

(c) washing said uncondensed gas in a washing zone with cold methanol, (1) the mole ratio of said carbon monoxide and of said hydrogen in said first reaction zone being such that the mole ratio of said carbon monoxide to said hydrogen in the washed gas is smaller than 1:2;

(d) contacting the washed gas with a conventional copper-bearing catalyst known to promote the reaction of carbon monoxide and hydrogen to methanol, said washed gas and said catalyst being contacted at a temperature of about 250° C. and a gas pressure of 30 to 200 atmospheres in a second reaction zone until methanol is formed from said washed gas; and (e) returning the formed methanol to said first reaction zone for reaction with said carbon monoxide.

2. A process as set forth in claim 1, wherein the mole ratio of said carbon monoxide to said hydrogen in said first reaction zone is between 1:1 and 1:2.

3. A process as set forth in claim 2, wherein the temperature of said first reaction zone is between 80° and 120° C.

4. A process as set forth in claim 3, wherein said carbon monoxide, said hydrogen, and said methanol in said first reaction zone contain less than 10 p.p.m. sulfur, not more than 0.5% carbon dioxide, and not more than 1% water.

5. A process as set forth in claim 2, wherein the mole ratio of said methanol to said carbon monoxide in said first reaction zone is between 1:1 and 1:3.

6. A process as set forth in claim 5, wherein the pressure in said second reaction zone is between 40 and 100 atmospheres.

7. A process as set forth in claim 1, wherein said cold methanol is returned to said first reaction zone after said washing of said uncondensed gas.

References Cited

FOREIGN PATENTS

| | | | |
|---|---|---|---|
| 970,072 | 9/1964 | Great Britain | 260—488 |
| 1,010,871 | 11/1965 | Great Britain | 260—488 |
| 1,084,549 | 9/1967 | Great Britain | 260—488 |
| 1,047,408 | 11/1966 | Great Britain | 260—488 K |

VIVIAN GARNER, Primary Examiner

U.S. Cl. X.R.

260—449.5

UNITED STATES PATENT OFFICE
CERTIFICATE OF CORRECTION

Patent No. 3,816,513 Dated June 11, 1974

Inventor(s) HACHIRO WAKAMATSU ET AL

It is certified that error appears in the above-identified patent and that said Letters Patent are hereby corrected as shown below:

In the heading, after "Ser. No. 178,933" insert --

Claims priority, application Japan, September 21, 1970, No. 45-81958/1970 --.

Signed and sealed this 19th day of November 1974.

(SEAL)
Attest:

McCOY M. GIBSON JR.
Attesting Officer

C. MARSHALL DANN
Commissioner of Patents